United States Patent
Ulrey et al.

(10) Patent No.: US 9,624,850 B2
(45) Date of Patent: Apr. 18, 2017

(54) SYSTEMS AND METHODS FOR CONTROL OF TURBINE-GENERATOR VIA EXHAUST VALVE TIMING AND DURATION MODULATION IN A SPLIT EXHAUST ENGINE SYSTEM

(71) Applicant: Ford Global Technologies, LLC, Dearborn, MI (US)

(72) Inventors: Joseph Norman Ulrey, Dearborn, MI (US); Thomas G. Leone, Ypsilanti, MI (US); Daniel Joseph Styles, Canton, MI (US); Karen Elizabeth Maceroni, Casco, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 14/537,722

(22) Filed: Nov. 10, 2014

(65) Prior Publication Data

US 2016/0131054 A1    May 12, 2016

(51) Int. Cl.
| | | |
|---|---|---|
| *F02D 23/00* | (2006.01) | |
| *F02B 33/44* | (2006.01) | |
| *F01D 15/10* | (2006.01) | |
| *H02K 7/18* | (2006.01) | |
| *H02P 9/04* | (2006.01) | |
| *F02D 41/00* | (2006.01) | |
| *F02D 13/02* | (2006.01) | |
| *F02D 29/06* | (2006.01) | |
| *F01N 5/04* | (2006.01) | |

(52) U.S. Cl.
CPC .......... *F02D 41/0007* (2013.01); *F01N 5/04* (2013.01); *F02D 13/0246* (2013.01); *F02D 13/0257* (2013.01); *F02D 29/06* (2013.01)

(58) Field of Classification Search
CPC ............ F02D 41/0007; F02D 13/0246; F02D 13/0257; F02D 29/06; F02B 37/183
USPC ............................. 60/602, 607–608; 290/52
See application file for complete search history.

(56) References Cited

U.S. PATENT DOCUMENTS

| | | |
|---|---|---|
| 3,559,397 A | 2/1971 | Navarro |
| 5,857,336 A * | 1/1999 | Paul ...................... F02B 37/00 60/597 |
| 6,169,332 B1 | 1/2001 | Taylor et al. |

(Continued)

OTHER PUBLICATIONS

Möller, Christel Elmqvist et al., "Divided Exhaust Period—A Gas Engine System for Turbocharged SI Engines," SAE Technical Paper Series No. 2005-01-1150, 2005 SAE World Congress, Detroit, MI., Apr. 11-14, 2005, 15 pages.

(Continued)

*Primary Examiner* — Thai Ba Trieu
(74) *Attorney, Agent, or Firm* — Julia Voutyras; McCoy Russell LLP

(57) ABSTRACT

Methods and systems are provided for reducing exhaust energy delivered to a turbine of a turbine-generator coupled to a split exhaust engine system in order to reduce turbine over-speed conditions and/or to reduce a generator output. In one example, a method may include retarding a first timing of a first exhaust valve utilized to deliver a blowdown portion of exhaust energy to the turbine, and/or advancing a second timing of a second exhaust valve utilized to deliver a scavenging portion of exhaust energy to an exhaust catalyst in response to a turbine speed greater than a threshold speed.

20 Claims, 8 Drawing Sheets

(56) References Cited

U.S. PATENT DOCUMENTS

| | | |
|---|---|---|
| 6,460,337 B1 | 10/2002 | Olofsson |
| 6,553,977 B2 | 4/2003 | Schmitz |
| 6,595,183 B1 | 7/2003 | Olofsson |
| 6,715,289 B2 | 4/2004 | Mader et al. |
| 7,044,885 B2 | 5/2006 | Doering |
| 7,260,467 B2 | 8/2007 | Megli et al. |
| 8,065,878 B2* | 11/2011 | Vuk .................... F02D 13/0249 123/90.15 |
| 8,069,663 B2 | 12/2011 | Ulrey et al. |
| 8,091,357 B2 | 1/2012 | Robel |
| 8,272,362 B2 | 9/2012 | Shane et al. |
| 8,364,378 B2* | 1/2013 | De Graaff ................. F01N 5/04 290/52 |
| 8,479,511 B2 | 7/2013 | Pursifull et al. |
| 8,511,084 B2 | 8/2013 | Ulrey et al. |
| 8,539,770 B2 | 9/2013 | Williams |
| 8,601,811 B2 | 12/2013 | Pursifull et al. |
| 8,671,898 B2 | 3/2014 | Brandt et al. |
| 8,701,409 B2 | 4/2014 | Pursifull et al. |
| 8,713,937 B2 | 5/2014 | Pursifull et al. |
| 8,739,527 B2 | 6/2014 | Ulrey et al. |
| 8,931,273 B2 | 1/2015 | Rollinger et al. |
| 9,080,523 B1* | 7/2015 | Ulrey .................. F02D 13/0242 60/602 |
| 2008/0185194 A1 | 8/2008 | Leone |
| 2009/0045629 A1* | 2/2009 | Vuk ........................ F02B 37/00 290/52 |
| 2010/0263639 A1 | 10/2010 | Uhrich et al. |
| 2011/0219767 A1 | 9/2011 | Miyashita |
| 2012/0055153 A1* | 3/2012 | Murata ................... F02B 41/10 60/602 |
| 2012/0137676 A1* | 6/2012 | Murata ................... F02B 37/18 60/602 |
| 2013/0305709 A1 | 11/2013 | Rollinger et al. |
| 2013/0305714 A1 | 11/2013 | Rollinger et al. |
| 2013/0305715 A1 | 11/2013 | Rollinger et al. |
| 2013/0305716 A1 | 11/2013 | Rollinger et al. |
| 2014/0053551 A1 | 2/2014 | Pursifull et al. |
| 2015/0316005 A1* | 11/2015 | Madison ............... F02D 41/006 60/602 |
| 2016/0131046 A1* | 5/2016 | Leone ................... F02D 41/021 60/600 |

OTHER PUBLICATIONS

Roth, David et al., "Valve-Event Modulated Boost System," SAE Technical Paper Series No. 2010-01-1222, published Apr. 12, 2010, 16 pages.

Roth, David et al., "Valve-Event Modulated Boost System: Fuel Consumption and Performance with Scavenge-Sourced EGR," SAE Technical Paper Series No. 2012-01-0705, published Apr. 16, 2012, 9 pages.

Hu, Bo et al., "1-D Simulation Study of Divided Exhaust Period for a Highly Downsized Turbocharged SI Engine—Scavenge Valve Optimization," SAE Technical Paper Series No. 2014-01-1656, published Apr. 1, 2014, 10 pages.

Haughton, Andrew et al., "Development of an Exhaust Driven Turbine-Generator Integrated Gas Energy Recovery System (TIGERS®)," SAE Technical Paper Series No. 2014-01-1873, published Apr. 1, 2014, 8 pages.

Leone, Thomas G. et al., "Systems and Methods for Control of Turbine-Generator Via Valve Deactivation in a Split Exhaust Engine System," U.S. Appl. No. 14/537,697, filed Nov. 10, 2014, 51 pages.

Glugla, Chris P., "Method for Pre-Ignition Control in a Pre-Delivery Phase," U.S. Appl. No. 14/550,611, filed Nov. 21, 2014, 62 pages.

\* cited by examiner

SYSTEMS AND METHODS FOR CONTROL OF TURBINE-GENERATOR VIA EXHAUST VALVE TIMING AND DURATION MODULATION IN A SPLIT EXHAUST ENGINE SYSTEM

FIELD

The present description relates generally to methods and systems for controlling an engine including a split exhaust manifold to adjust a turbine-generator speed coupled to the split-exhaust manifold via modulation of exhaust valve timing and duration.

BACKGROUND/SUMMARY

In engine systems with split exhaust manifold, a blowdown exhaust valve of a cylinder may be opened first to deliver exhaust mass flow from an initial portion of an exhaust phase to a turbine of a turbocharger or a turbine-driven generator, while a scavenging valve may be opened later to deliver exhaust mass flow from a latter portion of the exhaust phase directly to an exhaust catalyst, bypassing the turbine. In this way, by directing exhaust gases away from the turbine during the latter portion of the exhaust phase, the pumping penalty associated with high turbine backpressure may be reduced.

One example of such a split exhaust engine system is illustrated by Robel in U.S. Pat. No. 8,091,357. Therein, an exhaust system includes a turbo compounding device located in a first exhaust branch, and an exhaust gas treatment device is located in a second exhaust branch. The turbo compounding device receives exhaust gases through a first exhaust valve and the exhaust gas treatment device receives exhaust gases through a second exhaust valve. A timing strategy for controlling the first exhaust valve and the second exhaust valve is based on a pressure sensor utilized to monitor an exhaust backpressure.

However, the inventors herein have recognized potential issues with such a system. As one example, Robel does not provide any method for controlling a turbine speed and/or an output of the turbo compounding device. For example, during engine operation, a turbine speed may increase above a threshold which when left unchecked may lead to sub-optimal and unsafe performance of the system.

Thus in one example, some of these issues may be at least partly addressed by a method for an engine, comprising: in response to a turbine speed greater than a first threshold turbine speed, retarding an opening time of a first exhaust valve of a cylinder delivering exhaust gas to a turbine of the turbine-generator. In this way, by adjusting timing of the exhaust valve, an amount of exhaust mass flow to the turbine may be reduced.

For example, a split exhaust engine system may include a first exhaust valve (herein referred to as blowdown valve) for delivering a first portion of exhaust energy (herein referred to as blowdown energy) to a turbine of a turbine-generator located in a first exhaust passage. The engine system may further include a second exhaust valve (herein referred to as scavenging valve) for delivering a latter portion of exhaust energy (herein referred to as scavenging energy) to an exhaust catalyst located in a second, different exhaust passage. The catalyst may be located downstream of the turbine-generator such that output of the turbine-generator passes through the catalyst. During engine operating conditions when a turbine speed of the turbine-generator is greater than a threshold speed or when a generator output is greater than a threshold output, an engine controller may reduce an amount of exhaust gas (that is, blowdown gas) delivered to the turbine by retarding an opening timing of the blowdown valve; and/or advancing an opening timing of the scavenging valve and a closing timing of the scavenging valve. In some examples, a duration of the scavenging valve may be increased by advancing the opening timing of the scavenging valve with little or no advance of closing timing of the scavenging valve. Further, a degree of retard and a degree of advance of the blowdown and the scavenging valve may be adjusted based on one or more of the turbine speed, a difference between a desired turbine speed and an actual turbine speed, a difference between a desired generator output and an actual generator output, and an engine speed/load condition.

In some other examples, in addition to adjusting the timing and the duration of the blowdown and the scavenging valves, the opening degree of a wastegate valve may be adjusted to change an amount of exhaust gas bypassing the turbine.

In this way, by modulating phasing and duration of the blowdown and the exhaust valves based on turbine speed and/or generator output to reduce the amount of exhaust energy delivered to the turbine of the turbine-generator, the occurrence of turbine over-speed and excess generator output conditions which may decrease an efficiency and/or durability of the engine system may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
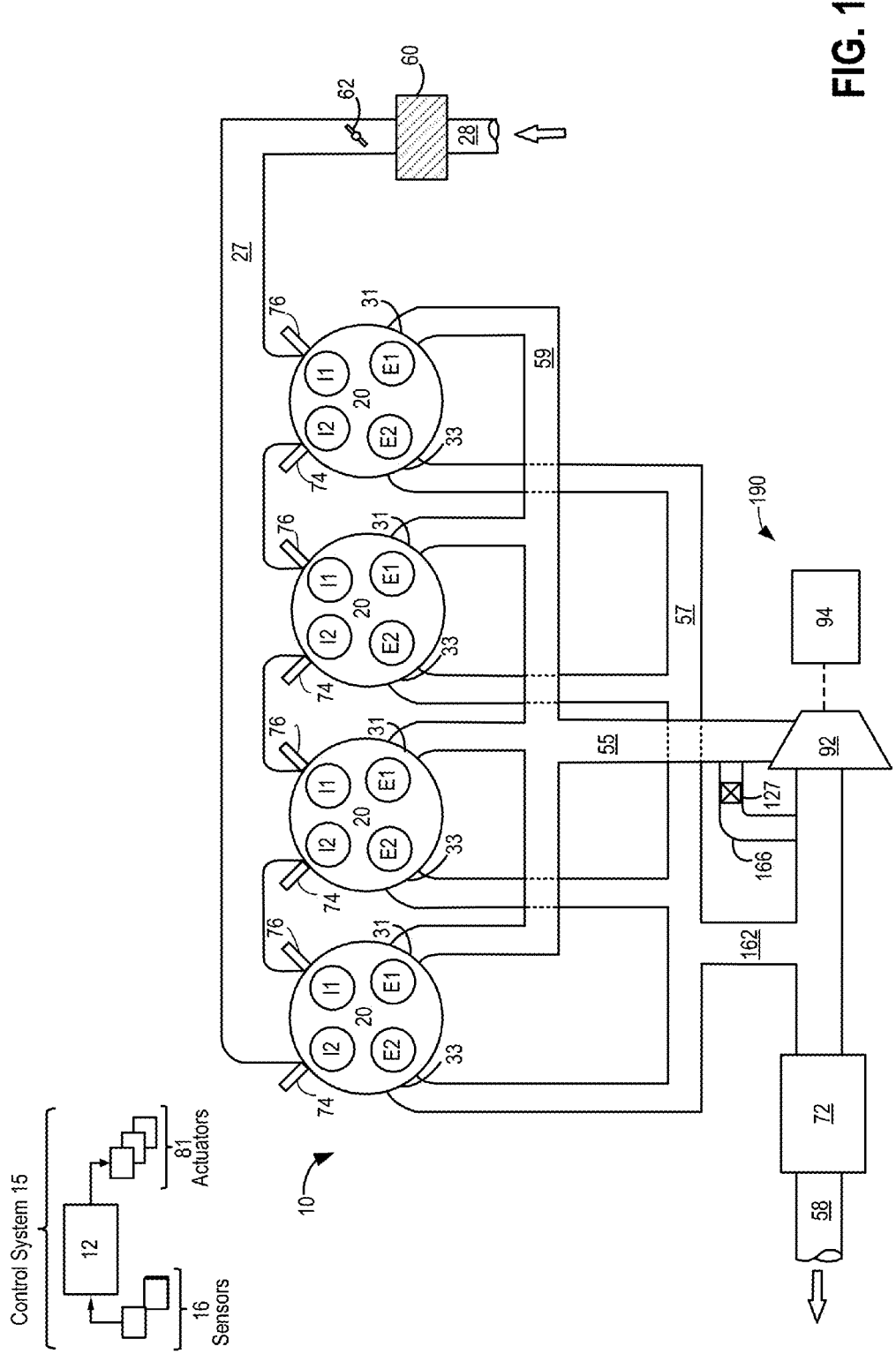
FIG. 1 shows a schematic depiction of a naturally aspirated engine system with a split exhaust manifold and a turbine generator
Figure 2:
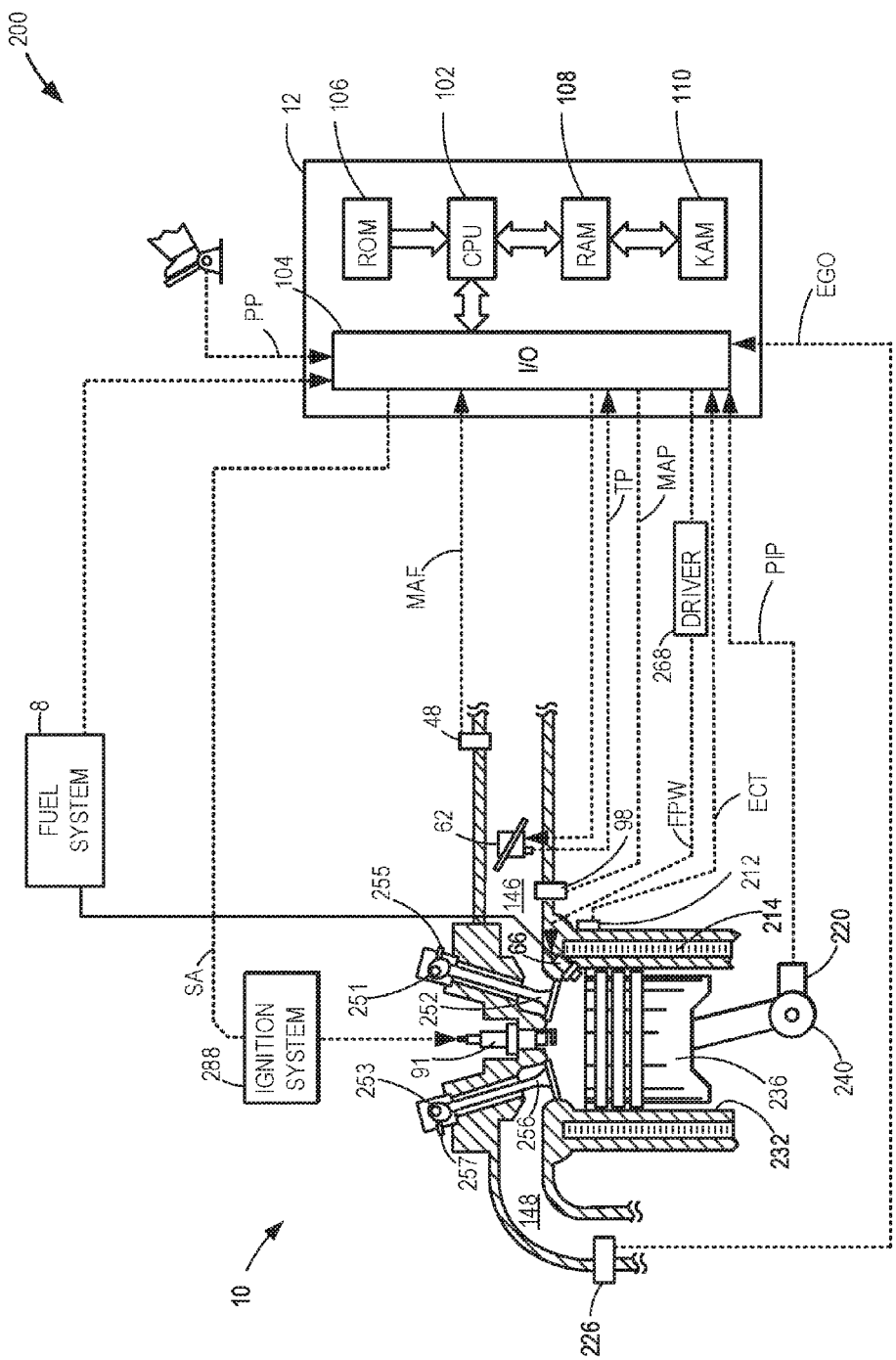
FIG. 2 shows a schematic depiction of a combustion chamber of the engine system of FIG. 1.
Figure 6:
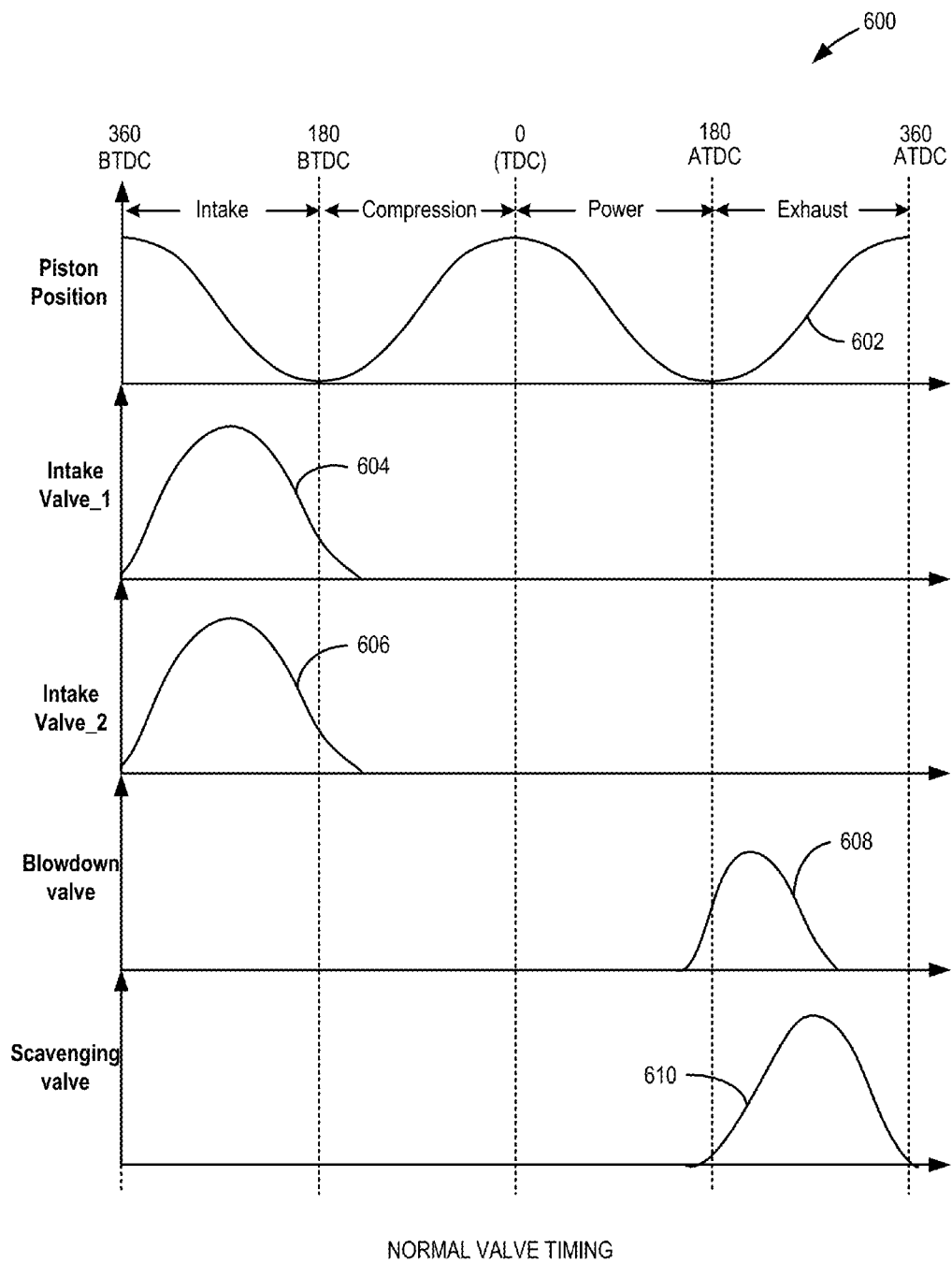
FIG. 6 shows an example normal intake and exhaust valve timing and duration, according to the present disclosure.
Figure 7:
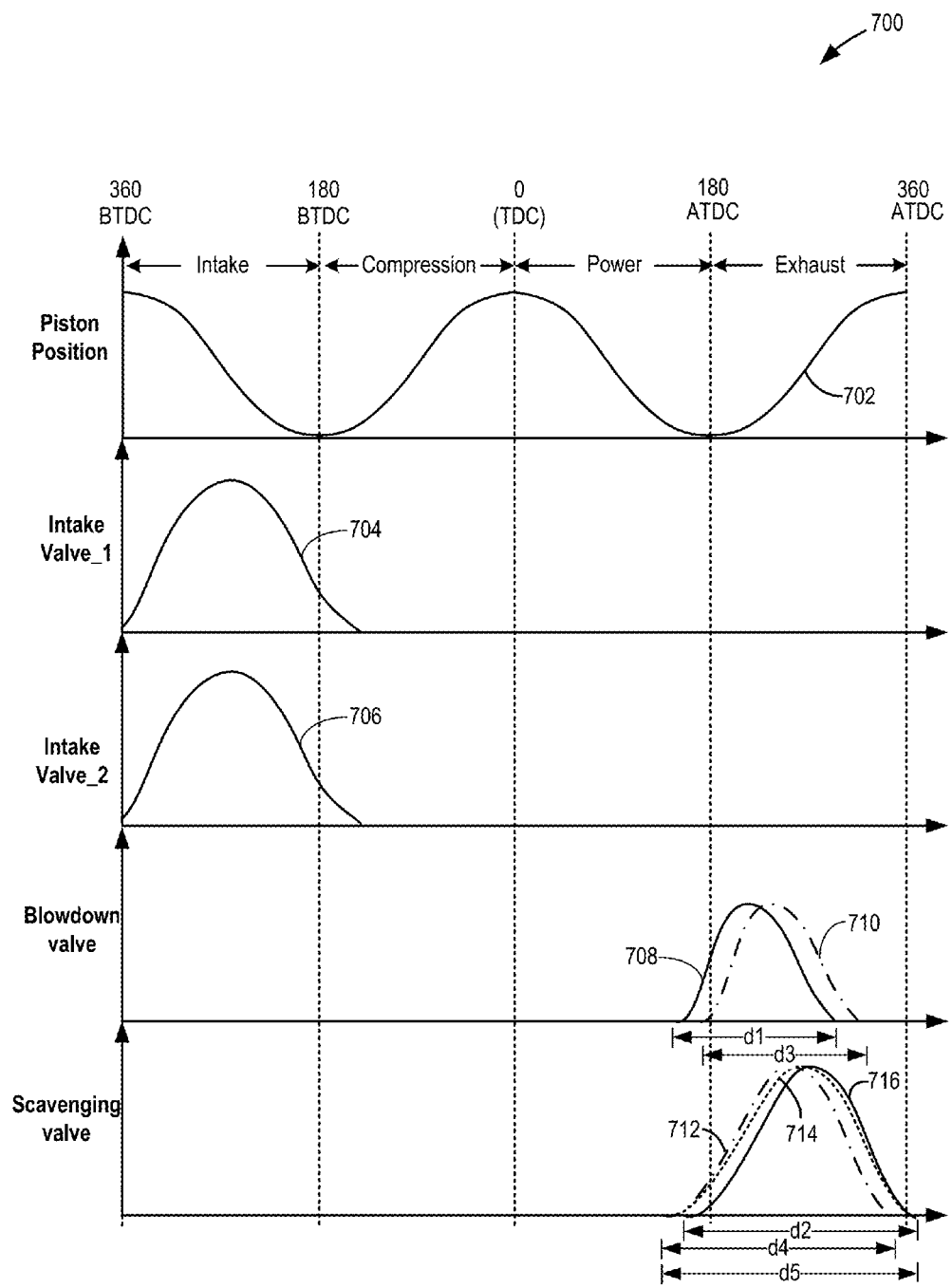
FIG. 7 shows an example adjusted intake and exhaust valve timing and duration to reduce energy to the turbine, according to the present disclosure.
Figure 8:
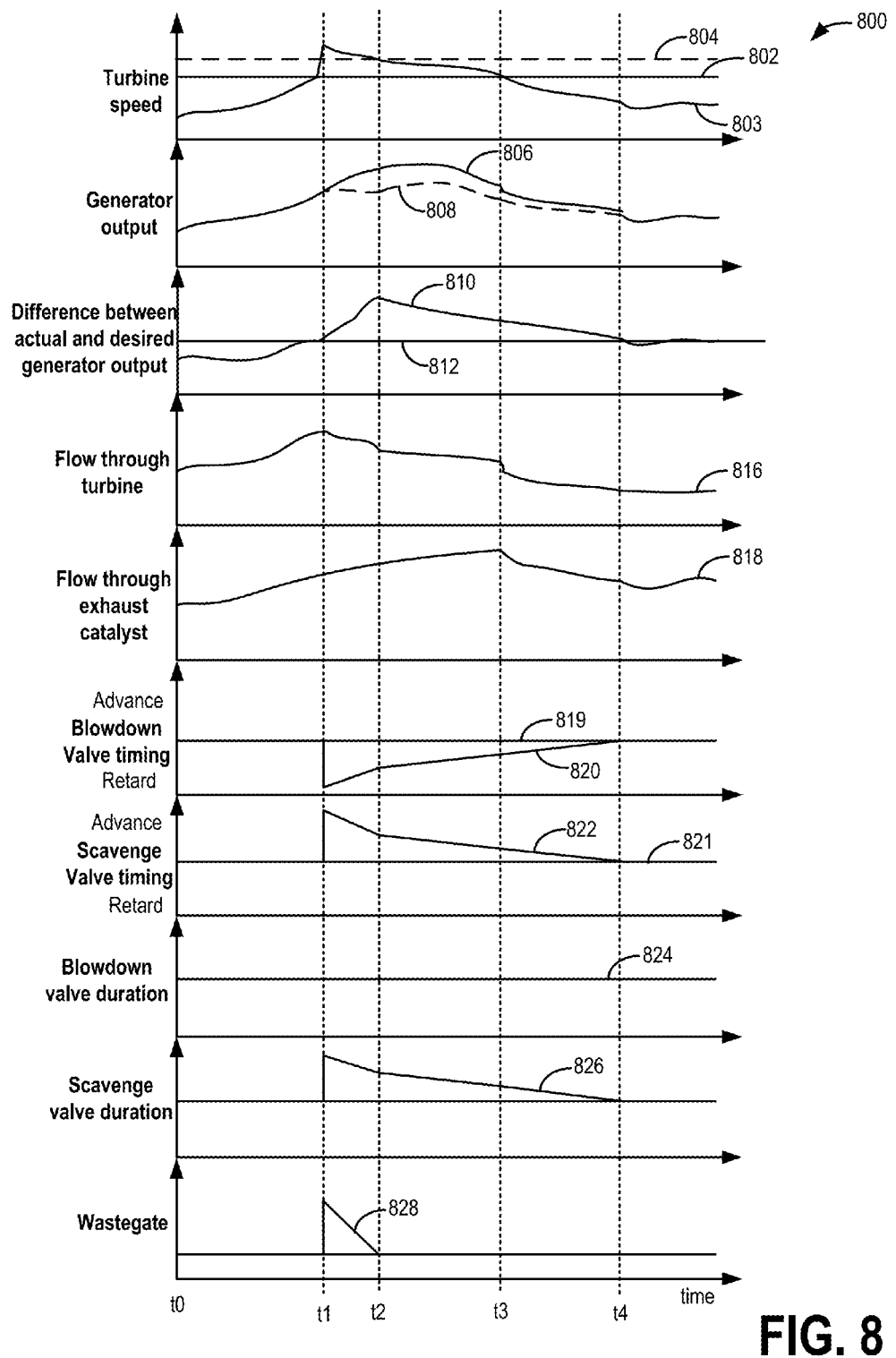
FIG. 8 shows a map depicting example adjustment of a blowdown exhaust valve and a scavenging exhaust valve timing and duration based on turbine speed and/or generator output.

The following description relates to systems and methods for reducing exhaust energy delivered to a turbine driving a turbine-generator in a split exhaust engine system, such as engine system 10 of FIGS. 1-2 in order to prevent turbine over-speed conditions and/or to reduce a turbine generator output. Specifically, the split exhaust engine system may include a first exhaust valve (also herein referred to as a blowdown valve) for delivering a blowdown portion of exhaust gas from an engine cylinder to the turbine generator located in a first exhaust passage via a first exhaust manifold, and a second exhaust valve (also herein referred to as a scavenging valve or scavenge valve) for delivering a scavenging portion of exhaust gas from the engine cylinder to an exhaust catalyst via a second exhaust manifold and a second passage. In response to a turbine speed greater than a threshold speed and/or a turbine generator output greater than a threshold output, an engine controller included in the engine system may be configured to perform a control routine, such as the routine of FIG. 3 to adjust a timing and/or a duration of the blowdown valve and/or the scavenging valve to reduce an amount of exhaust energy delivered to the turbine. An example routine to determine a desired generator speed for determining the turbine speed threshold above which exhaust energy to the turbine may be reduced is shown at FIG. 4. The modulation of timing and duration of the blowdown and scavenging exhaust valves may be determined according to the example routine of FIG. 5. An example of valve timings and duration including valve timings and duration of the blowdown valve and the scavenging valve during normal engine operation (that is, when the turbine speed is less than the threshold speed and the generator output is less than the threshold output) is illustrated at FIG. 6. An example of valve timings and duration including valve timings and duration of the blowdown valve and the scavenging valve during engine operation in response to the turbine speed greater than the threshold speed and/or the generator output less than the threshold output is illustrated at FIG. 7. An example adjustment of timing and duration of the blowdown valve and the scavenging valve in response to turbine speed and/or generator output is shown at FIG. 8.

By utilizing the systems and methods described herein, the technical effect of reducing exhaust energy delivered to the turbine of the turbine generator via modulation of the blowdown valve and/or the scavenging valve timing and/or duration in the split exhaust engine system (e.g. engine system 10 at FIG. 1) may be achieved.

FIG. 1 shows a schematic diagram of a naturally aspirated multi-cylinder internal combustion engine 10, which may be included in a propulsion system of an automobile. Engine 10 may include a plurality of combustion chambers (that is, cylinders) 20. In the depicted example, engine 10 includes four cylinders arranged in an in-line configuration. However, in alternate examples, engine 10 can include one or more cylinders such as 2, 3, 4, 5, 6, 8, 10 or more cylinders, arranged in alternate configurations, such as V-6, I-6, V-12, opposed 4, boxer, etc.

Each cylinder 20 of engine 10 may be configured to receive intake air from an intake manifold 27 via an air intake passage 28. Intake passage 28 may include an air intake throttle 62 downstream of an air filter 60. The position of throttle 62 can be adjusted by control system 15 via a throttle actuator (not shown) communicatively coupled to controller 12. By modulating throttle 62, an amount of fresh air may be inducted from the atmosphere into engine 10 and delivered to the engine cylinders at or below barometric (or atmospheric) pressure via intake passage 28. Intake manifold 27 may be coupled to the combustion chambers via intake ports (not shown). Each intake port may supply air and/or fuel to the cylinder it is coupled to for combustion. Each cylinder intake port can selectively communicate with the cylinder via one or more intake valves. In the depicted example, each cylinder 20 is shown with two intake valves I1 and I2. In one example, an intake passage may be formed from intake manifold 27 selectively communicating with each intake valve. In other embodiments, an intake passage for a single cylinder may be split close to the cylinder into two adjacent paths with a wall in-between, each split path of the passage communicating with a single intake valve. In another example, each of the two intake valves may be controlled to open at specific engine speeds and therefore, may communicate through a common intake port with the intake manifold.

Each combustion chamber may exhaust combustion gases via two exhaust ports coupled thereto. In the depicted example, each cylinder 20 is coupled to a first exhaust port 31 via a first exhaust valve E1, and to a second exhaust port 33 via a second exhaust valve E2. Each exhaust port of each cylinder may lead to different exhaust manifolds for channeling a first initial portion of exhaust gas (also herein referred to as blowdown portion) and a second latter portion of exhaust gases (also herein referred to as scavenging portion) separately. For example, each of the first exhaust ports 31 from each of the cylinders 20 may combine into a first exhaust manifold 59. Similarly, each of the second exhaust ports 33 from each of the cylinders 20 may combine into a second exhaust manifold 57. In this way, each combustion chamber 20 may exhaust a blowdown portion of combustion gases into first exhaust manifold 59 via first exhaust valve E1, and exhaust a scavenging portion of combustion gases into second exhaust manifold 57 via second exhaust valve E2. Such an exhaust system including two exhaust manifolds, one manifold for conducting the blowdown portion of the exhaust, and the other manifold for conducting the scavenging portion of the exhaust will be referred to herein as the "split exhaust system".

Engine 10 may include a turbine-driven generator 190 located in a first exhaust passage 55 coupled to first exhaust manifold 59. Turbine-driven generator 190 may include an exhaust turbine 92 and a generator 94 coupled on a common shaft. Further, a wastegate 127 may be included in a bypass 166 coupled between an inlet and outlet of the exhaust turbine to control an amount of exhaust gas delivered to the turbine. In some examples, the wastegate may not be included. In such systems without a wastegate, the amount of exhaust gas delivered to the turbine may be controlled mainly by modulating phasing and/or duration of the blowdown valves and/or the scavenging valves in one or more cylinders.

As discussed above, the exhaust manifolds may be designed to separately channel the blowdown and the scavenging portions of the exhaust. Exhaust manifold 59 may channel the blowdown pulse of the exhaust to turbine 92 of turbine-generator 190 via first exhaust passage 55 while exhaust manifold 57 may channel the scavenging portion of exhaust via a second exhaust passage 162 to downstream of turbine 92 and upstream of an emission control device 72. For example, exhaust valves E1 channel the blowdown portion of the exhaust gases through exhaust manifold 59 and first exhaust passage 55 to the turbine while exhaust valves E2 channel the scavenging portion of exhaust gases through exhaust manifold 57 via second exhaust passage 162 to emission control device 72. As such, the first exhaust valve may open at a timing earlier than the second exhaust valve, and may be closed at a timing earlier than the second exhaust valve.

Exhaust gases exiting turbine 92 may pass through emission control device 72 as well. Emission control device 72 can include multiple catalyst bricks, in one example. In another example, multiple emission control devices, each with multiple bricks, can be used. In some examples, emission control device 72 may be a three-way type catalyst. In other examples, emission control device 72 may include one or a plurality of a diesel oxidation catalyst (DOC), and a selective catalytic reduction catalyst (SCR). After passing through emission control device 72, exhaust gas may be directed out to a tailpipe 58.

In this way, combusted gases exiting a cylinder may be separated into two parts via two distinct exhaust passages formed by the split exhaust manifold. For example, in one combustion cycle, first exhaust valve E1 of cylinder 20 may channel a first portion of the exhaust, namely the blowdown portion, to turbine 92 via first exhaust passage 55, and a second exhaust valve E3 of the same cylinder (20) may direct a second portion of exhaust gases following the blowdown portion to an emission control device 72 via the second passage 162. The second portion of exhaust gases exiting via the second exhaust valve E2 may primarily be the scavenging portion of exhaust gases.

In FIG. 1, fuel injectors are shown coupled directly to the combustion chambers for injecting fuel directly therein in proportion to a pulse width of a signal FPW received from controller 12 via an electronic driver, for example. Each cylinder 20 is shown coupled with two injectors 74 and 76 per cylinder at each intake valve. In this manner, the fuel injectors provide what is known as direct injection of fuel into the combustion chamber. Each respective fuel injector may be mounted in the side of the respective combustion chamber or in the top of the respective combustion chamber, for example. In some examples, one or more fuel injectors may be arranged in intake manifold 27 in a configuration that provides what is known as port injection of fuel into the intake ports upstream of the respective combustion chambers. Though not shown in FIG. 1, fuel may be delivered to the fuel injectors by a fuel system including a fuel tank, a fuel pump, a fuel line, and a fuel rail.

In some examples, a distributorless ignition system (not shown) may provide an ignition spark to spark plugs (not shown) coupled to combustion chambers 20 in response to controller 12.

Engine 10 may be controlled at least partially by a control system 15 including controller 12 and by input from a vehicle operator via an input device (not shown). Control system 15 is shown receiving information from a plurality of sensors 16 (various examples of which are described herein) and sending control signals to a plurality of actuators 81. As one example, sensors 16 may include turbo-compressor inlet pressure and temperature sensors, and manifold air pressure (MAP) sensors located within the intake passage. Other sensors may include a throttle inlet pressure (TIP) sensor for estimating a throttle inlet pressure (TIP) and/or a throttle inlet temperature sensor for estimating a throttle air temperature (TCT) coupled downstream of the throttle in the intake passage. Additional system sensors and actuators are elaborated below with reference to FIG. 2. As another example, actuators 81 may include fuel injectors, and throttle 62. Controller 12 may receive input data from the various sensors, process the input data, and trigger the actuators in response to the processed input data based on instruction or code programmed therein corresponding to one or more routines. Example control routines are described herein with respect to FIGS. 3-5.

Referring to FIG. 2, it depicts a partial view 200 of a single cylinder of internal combustion engine 10. As such, components previously introduced in FIG. 1 are represented with the same reference numbers and are not re-introduced.

Engine 10 is depicted with combustion chamber (cylinder) 20, coolant sleeve 214, and cylinder walls 232 with piston 236 positioned therein and connected to crankshaft 240. Combustion chamber 20 is shown communicating with intake passage 146 and exhaust passage 148 via respective intake valve 252 and exhaust valve 256. As previously described in FIG. 1, each cylinder of engine 10 may exhaust combustion products along two conduits. In the depicted view 200, exhaust passage 148 represents the first exhaust port leading from the cylinder to the turbine (such as exhaust port 33 of FIG. 1) while the second exhaust conduit leading to the exhaust catalyst is not visible in this view.

As also previously elaborated in FIG. 1, each cylinder of engine 10 may include two (or more) intake valves and two (or more) exhaust valves. In the depicted view 200, intake valve 252 and exhaust valve 256 are located at an upper region of combustion chamber 20. Intake valve 252 and exhaust valve 256 may be controlled by controller 12 using respective cam actuation systems including one or more cams. The cam actuation systems may utilize one or more of cam profile switching (CPS), variable cam timing (VCT), variable valve timing (VVT) and/or variable valve lift (VVL) systems to vary valve operation. In the depicted example, each intake valve 252 is controlled by an intake cam 251 and each exhaust valve 256 is controlled by an exhaust cam 253. The position of intake valve 252 and exhaust valve 256 may be determined by valve position sensors 255 and 257, respectively.

In alternate embodiments, the intake and/or exhaust valve may be controlled by electric valve actuation. For example, cylinder 20 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In one example, intake cam 251 includes separate and different cam lobes that provide different valve profiles (e.g., valve timing, valve lift, duration, etc.) for each of the two intake valves of combustion chamber 20. Likewise, exhaust cam 253 may include separate and different cam lobes that provide different valve profiles (e.g., valve timing, valve lift, duration, etc.) for each of the two exhaust valves of combustion chamber 20. In another example, intake cam 251 may include a common lobe, or similar lobes, that provide a substantially similar valve profile for each of the two intake valves.

In addition, different cam profiles for the different exhaust valves can be used to separate exhaust gases exhausted at low cylinder pressure from exhaust gases exhausted at exhaust pressure. For example, a first exhaust cam profile can open from closed position the first exhaust valve just before BDC (bottom dead center) of the power stroke of combustion chamber 20 and close the same exhaust valve well before top dead center (TDC) to selectively exhaust blowdown gases from the combustion chamber. Further, a second exhaust cam profile can be positioned to open from close a second exhaust valve at about the mid-point of the exhaust stroke and close it before TDC to selectively exhaust the scavenging portion of the exhaust gases.

Continuing with FIG. 2, exhaust gas sensor 226 is shown coupled to exhaust passage 148. Sensor 226 may be positioned in the exhaust passage upstream of one or more emission control devices, such as device 72 of FIG. 1. Sensor 226 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. The downstream emission control devices may include one or more of a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Cylinder 20 can have a compression ratio, which is the ratio of volumes when piston 236 is at bottom center to top center. Conventionally, the compression ratio is in the range of 9:1 to 10:1 . However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 91 for initiating combustion. Ignition system 288 can provide an ignition spark to combustion chamber 20 via spark plug 91 in response to spark advance signal SA from controller 12, under select operating modes. However, in some embodiments, spark plug 91 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 20 is shown including one fuel injector 66. Fuel injector 66 is shown coupled directly to combustion chamber 20 for injecting fuel directly therein in proportion to the pulse width of signal FPW received from controller 12 via electronic driver 268. In this manner, fuel injector 66 provides what is known as direct injection (hereafter also referred to as "DI") of fuel into combustion cylinder 20. While FIG. 2 shows injector 66 as a side injector, it may also be located overhead of the piston, such as near the position of spark plug 91. Such a position may improve mixing and combustion when operating the engine with an alcohol-based fuel due to the lower volatility of some alcohol-based fuels. Alternatively, the injector may be located overhead and near the intake valve to improve mixing. In an alternate embodiment, injector 66 may be a port injector providing fuel into the intake port upstream of cylinder 20.

Fuel may be delivered to fuel injector 66 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 8 may hold fuel with different fuel qualities, such as different fuel compositions. These differences may include different alcohol content, different octane, different heat of vaporizations, different fuel blends, and/or combinations thereof etc. In some embodiments, fuel system 8 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Controller 12 is shown in FIG. 2 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 48; engine coolant temperature (ECT) from temperature sensor 212 coupled to coolant sleeve 214; a profile ignition pickup signal (PIP) from Hall effect sensor 220 (or other type) coupled to crankshaft 240; throttle position (TP) from a throttle position sensor; absolute manifold pressure signal (MAP) from sensor 98, cylinder AFR from EGO sensor 226, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 66, throttle 62, spark plug 91, intake/exhaust valves and cams, etc. The controller may receive input data from the various sensors, process the input data, and trigger the actuators in response to the processed input data based on instruction or code programmed therein corresponding to one or more routines. Example control routines will be described later with regard to FIGS. 3-5.

In one example, a system may comprise: an engine cylinder; a first exhaust valve for delivering an initial portion of exhaust gas from the cylinder to a turbine of a turbine-generator via a first exhaust passage; a second exhaust valve for delivering a latter portion of exhaust gas from the cylinder to an exhaust catalyst via a second exhaust passage separate from the first exhaust passage; and a controller with computer readable instructions for: retarding an opening time of the first exhaust valve with respect to a first normal exhaust valve opening timing in response to a turbine-generator speed greater than a threshold turbine-generator speed; and advancing an opening time of the second exhaust valve with respect to a second normal exhaust valve opening timing.

Further, in response to a difference between an actual turbine-generator output and a desired turbine-generator output less than a threshold difference, operating the engine with the first normal exhaust valve opening timing and the second normal exhaust valve opening timing; wherein the first exhaust valve opening timing is advanced with respect to the second exhaust valve opening timing.

Still further, a valve opening retard amount of the first exhaust valve and valve opening advance amount of the second exhaust valve may be increased with an increase in turbine-generator speed.

Figure 3:
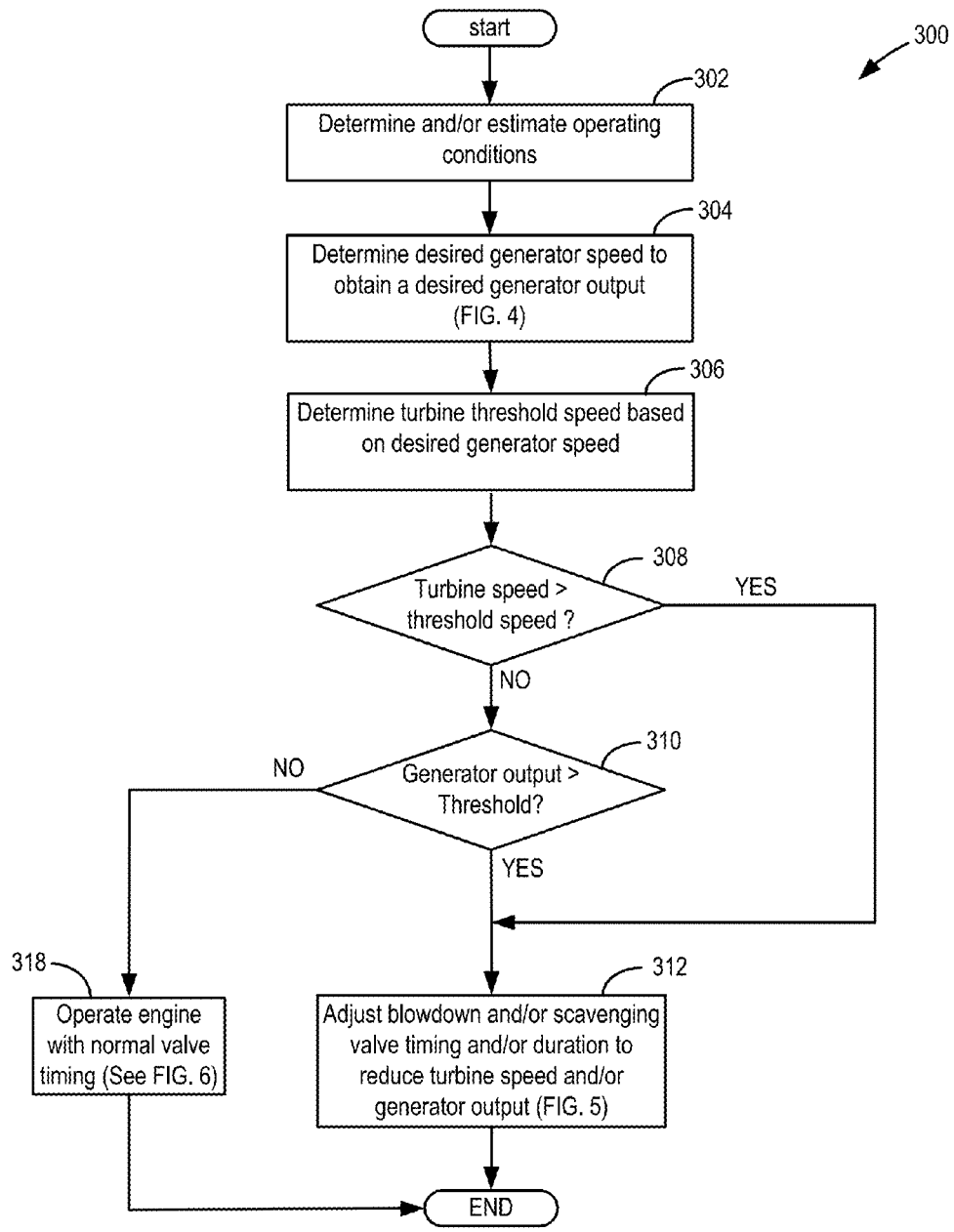
FIG. 3 shows a high level flow chart illustrating an example routine for reducing energy provided to a turbine of the turbine generator in order to control a turbine generator output and/or turbine generator speed.
Figure 4:
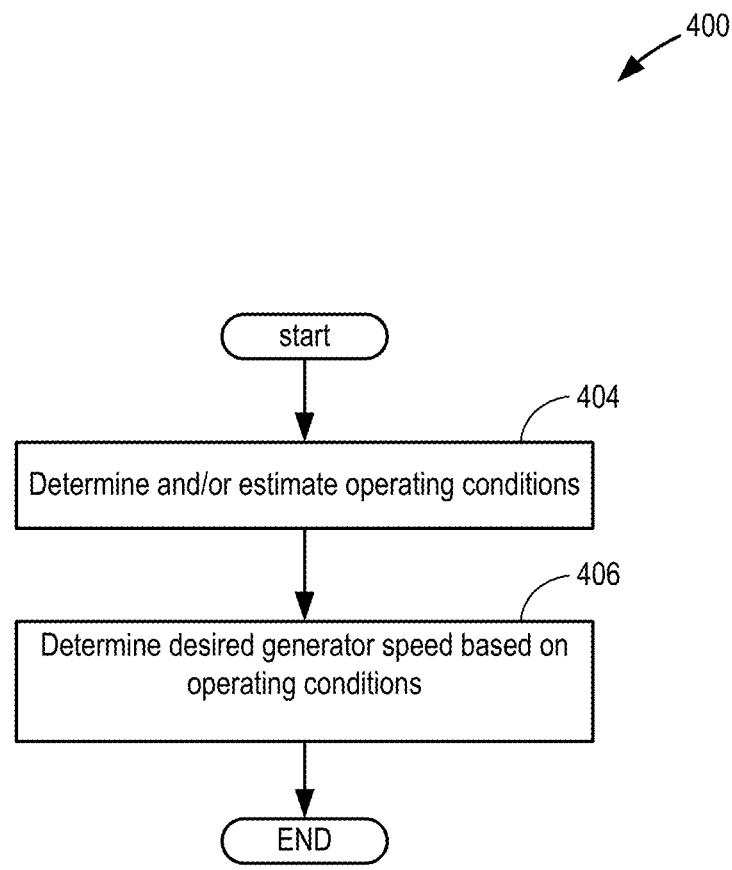
FIG. 4 shows a high level flow chart illustrating an example routine for determining a desired turbine generator speed, to be used in conjunction with FIG. 3.

Turning to FIG. 3, a method 300 for adjusting blowdown exhaust gas delivered to a turbine of a turbine-generator (e.g., turbine-generator 190 at FIG. 1) included in a split exhaust system is provided. For example, in order to prevent turbine-over speed conditions and/or reduce generator output, an amount of blowdown gases delivered to the turbine may be reduced. The method of FIG. 3 may be stored as executable instructions in non-transitory memory of controller 12 shown in FIGS. 1-2.

At 302, method 300 includes estimating and/or measuring operating conditions. Operating conditions may include but are not limited to battery state of charge, electrical demand or electrical load, turbine speed, generator speed, generator output, engine speed, engine load, accelerator position, throttle position, brake pedal position, vehicle speed, engine temperature, exhaust mass flow, exhaust temperature, ambient temperature, and load. As such, the generator output may be one or more of a generator output voltage, a generator output current, and a generator output power.

At 304, method 300 may include determining a desired generator speed based on the estimated operating conditions to obtain a desired generator output. Details of determining the desired generator speed will be further elaborated with respect to FIG. 4. Next, at 306, the method may include determining a turbine threshold speed based on the desired generator speed at current estimated engine speed and load conditions. For example, the turbine threshold speed may be a turbine speed above which an efficiency of the turbine may decrease below a threshold efficiency. Alternatively, the threshold speed may be a turbine speed above which turbine and/or generator durability are degraded at the current exhaust temperature and ambient temperature.

Upon determining the desired threshold speed, at 308, method 300 may include determining if an actual turbine speed is greater than the threshold speed. If the answer at 308 is YES, the method may proceed to 312. At 312, the method may include adjusting a valve timing and/or duration of a first exhaust valve (that is, blowdown valve), a second exhaust valve (that is, scavenging valve), and/or a wastegate to reduce a turbine speed and/or a generator output. The generator output may include one or more of a generator output voltage, a generator output current, or a generator output power. For example, a first exhaust valve timing for the first exhaust valve coupled to the first exhaust passage and a second exhaust valve timing for the second exhaust valve coupled to the second exhaust passage may be adjusted. The first exhaust valve timing may include a first exhaust valve opening timing and a first exhaust valve closing timing, and the second exhaust valve timing may include a second exhaust valve opening timing and a second valve closing timing. As such, a valve timing may be adjusted based on engine operating conditions. In one example, where the first exhaust valve and the second exhaust valve are coupled to an exhaust valve actuator, a phasing of the exhaust camshaft may be adjusted to open the first exhaust valve at the first exhaust valve timing and the second exhaust valve at the second exhaust valve timing. The first exhaust valve timing may be adjusted relative to the second exhaust valve timing based on engine operating conditions.

Specifically, during normal engine operation, the first exhaust valve timing may be adjusted to be earlier in an engine cycle than the second exhaust valve timing. For example, as further elaborated at FIG. 6, the first exhaust valve timing may be earlier (that is, significantly before 180 degrees ATDC) while the second exhaust valve timing may be later (that is, closer to 180 degrees ATDC). However, when the turbine speed increases above the threshold speed and/or when the generator output increases above the threshold output, the timing and/or the duration of the first exhaust valve and the second exhaust valve may be adjusted to decrease blowdown exhaust gas flow to the turbine. Specifically, in one example, in order to decrease blowdown exhaust gas to the turbine, the first exhaust valve timing may be retarded and the second exhaust valve timing may be advanced. In another example, a second exhaust valve duration may be increased to increase an amount of exhaust gas by passing the turbine. Consequently, blowdown gas flow to the turbine may be decreased.

In some examples, during normal operation, adjusting a timing of the second exhaust valve may include opening the second exhaust valve between 170 and 210 degrees after top dead center and closing the second exhaust valve between 350 and 390 degrees after top dead center.

In addition to first and second exhaust valve timings and duration, a valve lift for each exhaust valve may be determined. The phasing of the camshaft may be accordingly adjusted. In one example, the first exhaust valve may be opened with a first amount of valve lift while the second exhaust valve is opened with a second, different amount of valve lift. For example, as elaborated in FIGS. 6-7, the first amount of valve lift of the first exhaust valve may be smaller than the second amount of valve lift of the second exhaust valve. In another example, the first exhaust valve may be opened for a first duration while the second exhaust valve is opened for a second, different duration. For example, as elaborated in FIGS. 6-7, the first exhaust valve may be opened for a smaller duration than the second exhaust valve.

In some examples, in addition to adjusting the first and the second exhaust valve timing, duration and lift, a wastegate (e.g. wastegate 127 at FIG. 1) may be adjusted. For example, a wastegate valve degree of opening may be increased to increase an amount of exhaust gases diverted away from the turbine.

Returning to 308, if it is determined that the actual turbine speed is less than the threshold turbine speed; the method may proceed to 310. At 310, the method may include determining if the generator output is greater than threshold. If the answer at 310 is YES, the method may proceed to 312 to adjust the timing, the duration, and/or the lift of the first exhaust valve and/or the second exhaust valve to reduce turbine speed as discussed above. By reducing the turbine speed, the generator output of the turbine-generator may be decreased. Details of modulating the first and the second exhaust valve timing, duration, and lift to reduce turbine speed, and consequently generator output will be further elaborated with respect to FIG. 7.

If the answer at 310 is NO (that is, if the generator output is less than the threshold), the method may proceed to 318.

At 318, the method may include operating the engine with normal valve timing. That is, if it is determined that the turbine speed is below threshold, the generator output is below threshold, and the difference between the actual generator output and the desired generator output is less than the threshold difference, the engine may be operated normally, wherein the normal engine operation may include opening the blowdown valve first to deliver an initial portion of exhaust energy to turbine via the blowdown valve and then subsequently opening a scavenging valve to deliver a latter portion of the exhaust energy to the exhaust catalyst.

Further, during the normal engine operation, the wastegate may be closed. Details of normal engine operation will be further elaborated with respect to FIG. 6.

In this way, in response to the a turbine speed greater than the threshold speed or the generator output greater than the threshold, the timing, the duration, and/or the valve lift of the first and/or the second exhaust valves may be adjusted to reduce the amount of blowdown energy delivered to the turbine in order to prevent turbine-over speed and/or to reduce an output of the turbine-generator.

In some examples, the timing, the duration, and/or the valve lift of the first and/or the second exhaust valves, and/or the wastegate may be adjusted in response to a difference between an actual generator output and a desired generator output greater than a threshold difference.

In one example, a method for an engine with split exhaust may comprise:in response to a turbine speed greater than a first threshold turbine speed, retarding an opening time of a first exhaust valve of a cylinder delivering exhaust gas to a turbine of the turbine-generator. The method may further comprise advancing an opening time of a second exhaust valve of the cylinder delivering exhaust to an exhaust catalyst while bypassing the turbine. Still further, an opening duration of the second exhaust valve may be increased in response to the turbine speed greater than the first threshold speed. Further, an amount of a wastegate valve opening may be increased in response to the turbine speed greater than the first threshold speed, wherein the first turbine threshold speed is based on a desired generator speed. The desired generator speed may be based on a battery state of charge, an electrical demand or electrical load, an engine speed, an engine load, and an amount of exhaust mass flow into the turbine via the first exhaust valve.

The method may further comprise retarding the opening time of the first exhaust valve; and advancing the opening time of the second exhaust valve in response to a generator output greater than a threshold. Still further, in response to a difference between an actual generator output and a desired generator output less than a first threshold difference, the first exhaust valve may be operated at a first normal exhaust valve opening timing and a first normal exhaust valve opening duration; and the second exhaust valve may be operated at a second normal exhaust valve opening timing and a second normal exhaust valve opening duration, wherein the first normal exhaust valve opening time is advanced with respect to the second normal exhaust valve opening time.

FIG. 4 shows an example method 400 for determining a desired generator speed of a turbine-generator (e.g. turbine-generator 190 at FIG. 1) located in a first exhaust manifold (e.g. first exhaust manifold 59 at FIG. 1) of an engine system with split exhaust manifold (e.g. engine system 10 at FIG. 1). The desired generator speed may be a generator speed at which the turbine-generator may operate with respect to current engine operating conditions in order to obtain a desired generator output. The method of FIG. 4 may be used in conjunction with the method of FIG. 3. For example, method 400 may be performed at step 304 of method 300. The method of FIG. 4 may be stored as executable instructions in non-transitory memory of controller 12 shown in FIGS. 1-2.

At 404, the routine may include determining operating conditions including battery state of charge, electrical demand or electrical load, ambient temperature, engine speed, engine load and an exhaust mass flow to the turbine. The exhaust mass flow to the turbine may be an amount of exhaust mass flow delivered to the turbine of the turbine-generator via the first exhaust valve and the first exhaust passage. As discussed above, a first portion of the exhaust gas may be delivered to the turbine via the first exhaust valve and the first exhaust passage during a first portion of the exhaust phase.

Upon determining operating conditions, the method includes, at 406, determining a desired generator speed based on the current engine speed/load conditions, and further based on exhaust mass flow into the turbine. When battery state of charge is low, or when electrical load is high, the desired generator speed may be selected to maximize generator output, otherwise the desired generator speed may be selected to match generator output to current electrical load. In one example, the desired generator speed may be determined from a look-up table storing the desired generator speed for a plurality of engine speed and load conditions and electrical output levels. For example, at each of a plurality of engine speed and load conditions, the desired generator speed may be determined at least based on the engine speed and load condition, and the exhaust mass flow into the turbine, and the desired electrical output. Further, the desired generator speed may additionally be based on a turbine efficiency and a generator efficiency at each of the plurality of engine speed and load conditions. The look-up table may be generated including the desired speed for each speed/load condition and the look up table may be utilized to determine the desired generator speed during engine operation. The desired generator speed may also be truncated based on turbine and/or generator durability as a function of exhaust temperature and/or ambient temperature. As such, a threshold turbine speed may be determined based on operating conditions.

In this way, by setting the desired generator speed based on electrical conditions, engine speed/load conditions, and exhaust flow to the turbine, an electrical output of the turbine-generator may be adjusted for improved efficiency and performance and durability.

Figure 5:
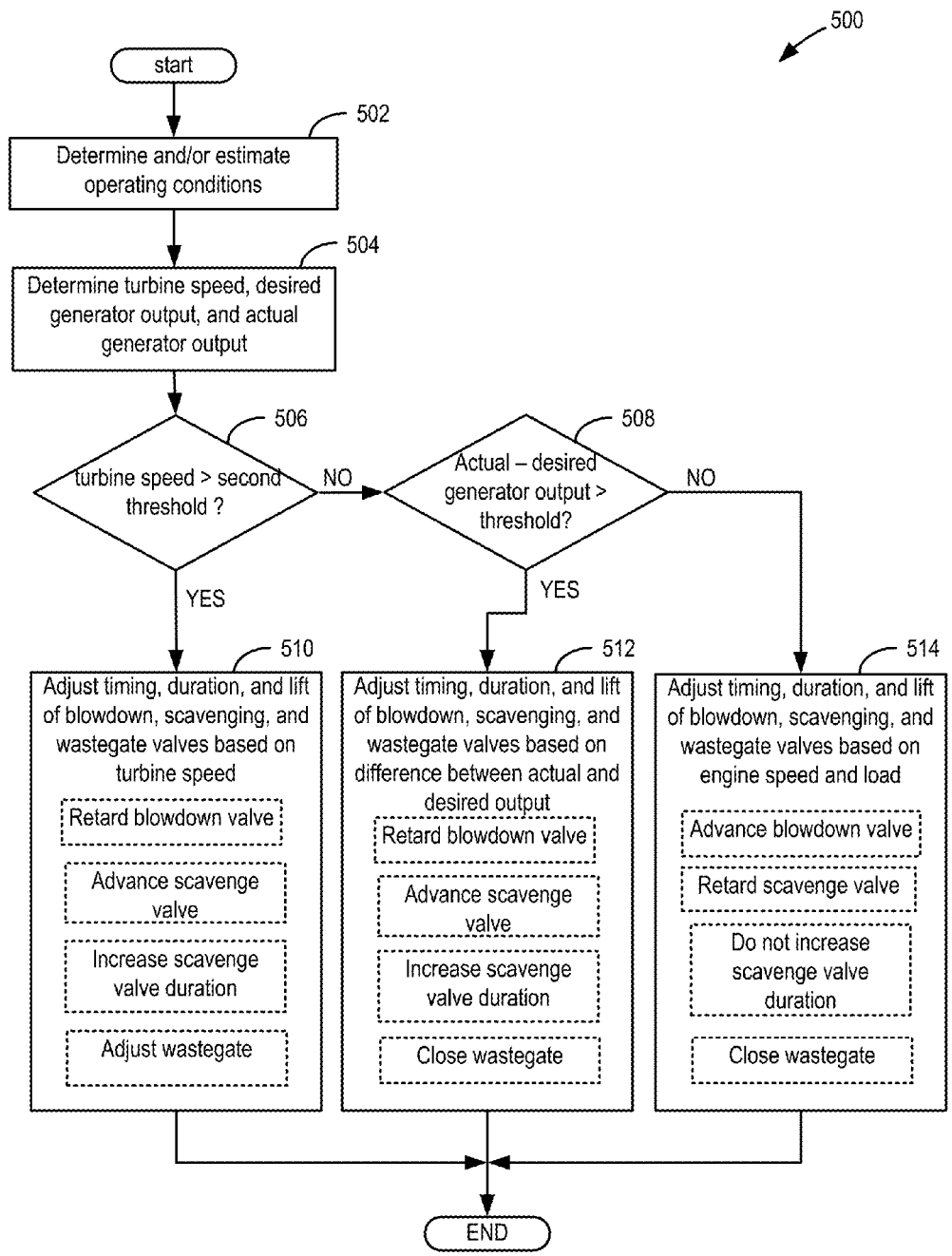
FIG. 5 shows a high level flow chart illustrating an example routine for adjusting valve phasing and duration of a blowdown exhaust valve and a scavenging exhaust valve in each cylinder of the engine for reducing energy provided to the turbine of the turbine generator, to be used in conjunction with FIG. 3.

FIG. 5 shows a method 500 for modulating timing and/or duration of a first exhaust valve (also referred to herein as blowdown exhaust valve or blowdown valve) and a second exhaust valve (also referred to herein as scavenging exhaust valve or scavenging valve) to reduce exhaust energy to a turbine of a turbine-generator to prevent turbine over-speed conditions and/or reduce a generator output. In particular, FIG. 5 shows method 500 for adjusting timing and/or duration of the blowdown valve and/or the scavenging valve when a turbine speed increases above a threshold speed and/or when a generator output increases above a threshold output. The method of FIG. 5 may be used in conjunction with the method of FIG. 3. For example, method 500 may be performed at step 312 of method 300. The method of FIG. 5 may be stored as executable instructions in non-transitory memory of controller 12 shown in FIGS. 1-2.

At 502, method 500 may include determining and/or estimating operating conditions. Operating conditions may include but are not limited to battery state of charge, electrical demand or electrical load, ambient temperature, turbine speed, generator speed, generator output, engine speed, accelerator position, throttle position, brake pedal position, vehicle speed, engine temperature, exhaust mass flow, and engine load. Next, at 504, the method may include determining a turbine speed, a desired generator output, and an actual generator output based on the operating conditions. As such, the desired generator output may be based on the operating conditions in a manner similar to that described above for step 406 of FIG. 6.

Next, at 506, the method may include determining if the turbine speed is greater than a second threshold speed. If yes, the routine may proceed to 510. At 510, the method may include adjusting timing and/or duration of the blowdown valve and/or the scavenging valve based on the turbine speed in order to reduce exhaust energy delivered to the turbine. For example, when the turbine speed is greater than the second threshold, the blowdown valve timing may be retarded by a first degree with respect to a normal blowdown valve timing, and/or the scavenging valve timing may be advanced by a second degree with respect to a normal scavenging valve timing. Further, a duration of the scavenge valve may be adjusted to a second scavenging valve duration that is greater than a normal scavenging valve duration to allow more exhaust gas to flow to the exhaust catalyst bypassing the turbine. Still further, a wastegate may be opened at a first wastegate opening amount to divert exhaust gases away from the turbine.

As such, the normal blowdown valve timing, the normal scavenging valve timing, and the normal scavenging valve duration may be utilized during normal engine operation (that is, when the turbine speed is less than the first threshold, and/or when the generator output is less than the threshold output). For example, during normal engine operation (as elaborated further at FIG. 6) the blowdown valve timing may be earlier in an exhaust stroke (that is, before to 180 degrees ATDC) while the scavenging valve timing may be later in the same exhaust stroke (that is, closer 180 degrees ATDC).

In one example, the duration of the scavenging valve may be increased by advancing an opening timing of the scavenging valve. In another example, the duration of the scavenging valve may be varied based on an engine speed. For example, as the engine speed increases, the duration of the scavenging valve may be increased. In this way, by increasing the duration of the scavenging valve with increase in the engine speed, pumping losses may be reduced.

In one example, the first degree of retard of the blowdown valve, the second degree of advance of the scavenging valve, the second duration of scavenging valve opening, and the first wastegate opening amount may be adjusted based on the turbine speed. For example, as the turbine speed increases, the degree of retard of the blowdown valve, the degree of advance of the scavenging valve, the duration of scavenging valve opening, and the first wastegate opening amount may be increased. In this way, the blowdown valve, the scavenging valve, and the wastegate may be adjusted based on the turbine speed to reduce the amount of exhaust gases flowing through the turbine when the turbine speed increases above the second threshold.

Returning to 506, if the turbine speed is not greater than the second threshold, the method may proceed to 508. At 508, the method may include determining if a difference between an actual generator output and a desired generator output is greater than a threshold difference. If the answer at 508 is YES, the method may proceed to 512.

At 512, upon confirming that the turbine speed is less than the second threshold speed and the difference is greater than the threshold difference, the method may include adjusting the phasing and duration of the blowdown valve and/or the scavenging valve based on the difference between the actual generator output and the desired generator output. For example, when the difference is greater than the threshold difference, the blowdown valve timing may be retarded by a third degree with respect to a normal blowdown valve timing, and/or the scavenging valve timing may be advanced by a fourth degree with respect to a normal scavenging valve timing. In one example, the third degree of retard may be less than the first degree of retard (the first degree of retard utilized at step 510 when the turbine speed is above the second threshold), and the fourth degree of advance may be less than the second degree of advance (the second degree of advance utilized at step 510). Further, the scavenging valve duration may be increased to a third scavenging valve duration. For example, the third scavenging valve duration may be less than the second scavenging valve duration utilized at step 510, and greater than the first scavenging valve duration utilized during normal valve operation (that is, when the turbine speed is less than the first threshold, and/or when the generator output is less than the threshold output). Still further, at 512, the wastegate may be closed. However, in some examples, the waste gate may be opened at a second wastegate opening amount, wherein the second wastegate opening amount may be less than the first wastegate opening amount.

In one example, the third degree of retard of the blowdown valve, the fourth degree of advance of the scavenging valve and the third duration of scavenging valve opening may be adjusted based on the difference between the actual generator output and the desired generator output. For example, as the difference between the actual generator output and the desired generator output increases, the third degree of retard of the blowdown valve, the fourth degree of advance of the scavenging valve, and the third duration of scavenging valve opening may be increased.

Returning to 508, if the answer at 508 is NO, that is, if the difference between the actual generator output and the desired generator output is less than the threshold difference, the method may proceed to 514. At 514, the method may include adjusting timing and duration of the blowdown valve and the scavenging valve based on normal operation, as a function of engine speed and load conditions. In one example, adjusting timing and duration of the blowdown valve and the scavenging valve may be based on mass air flow into the engine in addition to engine speed and load conditions. The blowdown valve may be adjusted to an advanced position, the scavenge valve to a retarded position, and the scavenge valve to a short duration, all varying slightly as a function of engine speed and load. Details of normal operation will be further elaborated with respect to FIG. 6.

In this way, by adjusting timing and duration of blowdown exhaust valve and/or the scavenging exhaust valve and/or the wastegate valve, the amount of exhaust energy delivered to the turbine may be reduced to prevent turbine over-speed conditions and/or to reduce the generator output.

In one example, a method for an engine with split exhaust including a turbine in a first exhaust passage coupled to a generator and an exhaust catalyst in a second exhaust passage, may comprise: flowing exhaust gas to the turbine via a first exhaust valve from an engine cylinder to the first exhaust passage; flowing exhaust gas to the catalyst via a second exhaust valve from the engine cylinder to the second exhaust passage; and advancing a second exhaust valve opening time by a second amount and increasing an opening duration of the second exhaust valve by a first duration during a first condition. Further, a first exhaust valve opening time may be retarded by a first amount and a waste gate may be opened by a first wastegate opening amount during the first condition. The first condition may include a turbine speed greater than a first threshold speed and a second threshold speed.

Still further, the first exhaust valve opening time may be retarded by a third amount, the second exhaust valve opening timing may be advanced by a fourth amount, the opening duration of the second exhaust valve may be increased by a second duration, and the wastegate may be closed to decrease exhaust gas flow to the turbine during a second condition. The second condition may include the turbine speed less than the second threshold speed and greater than the first threshold speed, and a difference between an actual generator output and a desired generator output greater than a second threshold difference Further, the first exhaust valve opening timing may be retarded by a fifth amount, a second exhaust valve opening timing may be advanced by a sixth amount, an opening duration of the second exhaust valve may be increased by a third duration, and the wastegate may be closed to decrease exhaust gas flow to the turbine during a third condition. The third condition may include the turbine speed less than the second threshold speed, and the difference between the actual generator output and the desired generator output less than the second threshold difference and greater than the first threshold difference.

As such, the first amount may be greater than the third amount; the third amount may be greater than the fifth amount; the first duration may be greater than the second duration; and the second duration may be greater than the third duration.

Further, increasing the opening duration of the second exhaust valve may include advancing an opening timing of the second exhaust valve from a normal opening timing of the second exhaust valve, and not changing a closing timing of the second exhaust valve with respect to a normal closing timing of the second exhaust valve, wherein the normal opening time of the second exhaust valve includes opening the second exhaust valve between 170 and 210 degrees after top dead center and closing the second exhaust valve between 350 and 390 degrees after top dead center.

Still further, a first amount of exhaust gas bypassing the turbine during the first condition may be greater than a second amount of exhaust gas bypassing the turbine during the second condition; and the second amount of exhaust gas during the second condition may be greater than a third amount of exhaust gas the third condition.

In some examples, in response to the turbine speed greater than the threshold, and/or the generator output greater than the threshold, the first exhaust valve timing (that is, the blowdown valve timing), the second exhaust valve timing (that is, the scavenging valve timing), the second exhaust valve duration (that is, the scavenging valve duration) and the wastegate opening may be adjusted simultaneously.

In some other examples, in response to the turbine speed greater than the threshold, and/or the generator output greater than the threshold, only one of the first exhaust valve timing, the second exhaust valve timing, the second exhaust valve duration and the wastegate opening may be adjusted.

In still other examples, in response to the turbine speed greater than the threshold, and/or the generator output greater than the threshold, one or more but not all of the first exhaust valve timing, the second exhaust valve timing, the second exhaust valve duration and the wastegate opening may be adjusted simultaneously.

Now turning to FIG. 6, map 600 depicts example intake valve timings and exhaust valve timings, with respect to a piston position, for an engine system including a first exhaust passage and a second, different exhaust passage. As such, the valve timings depicted in FIG. 6 may be a normal valve timing that may be utilized during normal engine operating conditions, which may include a turbine speed less than a threshold speed and a generator output less than a threshold output. For example, during normal engine operation, a first amount of exhaust gas may be delivered to a turbine of a turbine-generator included in the first exhaust passage through a first exhaust valve (also herein referred to as a blowdown exhaust valve), and a second amount of the exhaust gas may be delivered to an exhaust catalyst included in the second exhaust passage through a second exhaust valve (also herein referred to as a scavenging exhaust valve).

Map 600 illustrates an engine position along the x-axis in crank angle degrees. Curve 602 depicts piston positions (along the y-axis), with reference to their location from top dead center (TDC), before top dead center (BTDC), and after top dead center (ATDC) and further with reference to their location within the four strokes (intake, compression, power and exhaust) of an engine cycle.

During engine operation, each cylinder typically undergoes a four stroke cycle including an intake stroke, compression stroke, expansion stroke, and exhaust stroke. During the intake stroke, generally, the exhaust valves close and intake valves open. Air is introduced into the cylinder via the corresponding intake passage, and the cylinder piston moves to the bottom of the cylinder so as to increase the volume within the cylinder. The position at which the piston is near the bottom of the cylinder and at the end of its stroke (e.g. when the combustion chamber is at its largest volume) is typically referred to by those of skill in the art as bottom dead center (BDC). Herein, the intake stroke BDC is indicated as 180 degrees before top dead center (180 BTDC). During the compression stroke, the intake valves and exhaust valves are closed. The piston moves toward the cylinder head so as to compress the air within combustion chamber. The point at which the piston is at the end of its stroke and closest to the cylinder head (e.g. when the combustion chamber is at its smallest volume) is typically referred to by those of skill in the art as top dead center (TDC). Herein, the compression stroke TDC is indicated as 0 degrees TDC (0 TDC). In a process herein referred to as injection, fuel is introduced into the combustion chamber. In a process herein referred to as ignition, the injected fuel is ignited by known ignition means, such as a spark plug, resulting in combustion. During the expansion stroke, the expanding gases push the piston back to BDC. Herein, the expansion stroke BDC is indicated as 180 degrees after TDC (180 ATDC). A crankshaft converts this piston movement into a rotational torque of the rotary shaft. During the exhaust stroke, exhaust valves are opened to release the residual combusted air-fuel mixture to the corresponding exhaust passages and the piston returns to TDC.

Curve 604 depicts a first intake valve timing, lift, and duration for a first intake valve (Intake valve_1) coupled to an intake passage of the engine cylinder while curve 606 depicts a second intake valve timing, lift, and duration for a second intake valve (Intake valve_2) coupled to the intake passage of the engine cylinder. Curve 608 depicts a first exhaust valve timing, lift, and duration for the first exhaust valve (blowdown valve) coupled to the first exhaust passage of the engine cylinder, while curve 610 depicts a second exhaust valve timing, lift, and duration for the second exhaust valve (scavenging valve) coupled to the second exhaust passage of the engine cylinder. As previously elaborated, the first and second exhaust passages may be separate from, but arranged parallel to each other.

In the depicted example, the first intake valve (Intake valve_1) and the second intake valve (Intake valve_2) may be opened at a common intake valve timing, starting at or just before 360 degrees BTDC, and ending at or just after 180 degrees BTDC. Additionally, in this example, both the first and second intake valves are opened with the same amount of lift and for the same duration. In other examples, the intake valve opening timings may be staggered while the duration and the lift of the intake valves remain the same.

Now turning to the exhaust valves, the first exhaust valve is opened at the first exhaust valve opening timing that is earlier in the engine cycle than the second exhaust valve opening timing at which the second exhaust valve is opened. In other words, the first exhaust valve opening timing may be advanced relative to the second exhaust valve opening timing. Specifically, the second exhaust valve may be opened significantly prior to 180 degrees ATDC, while the timing of opening of the first exhaust valve may be advanced from the second exhaust valve opening timing. In this way, the first exhaust valve may be opened before the start of an exhaust stroke, as the piston travels towards the BDC near the end of the power stroke, and may close before the exhaust stroke ends. In comparison, the second exhaust valve may be opened after the first exhaust valve is opened (e.g. near the start of the exhaust stroke) and may remain open until the exhaust stroke ends or until a subsequent intake stroke has commenced. Additionally, the first exhaust valve may be opened with a first, lower amount of valve lift while the second exhaust valve may be opened with a second, higher amount of valve lift. While the depicted example illustrates different timing, lifts and durations for the different exhaust valves, it will be appreciated that in alternate embodiments, the exhaust valves may have the same amount of valve lift and/or same duration of opening while opening at staggered timings.

By opening the first exhaust valve prior to opening the second exhaust valve, a majority of the blowdown energy may be directed to the turbine coupled to the turbine-generator. Further, by opening the second exhaust valve, excess exhaust energy may be directed to the exhaust catalyst, thereby decreasing the backpressure between the turbine inlet and the exhaust port, which may reduce pumping penalty during the exhaust stroke.

In one example, where the first and second exhaust valves are coupled to an exhaust valve actuator, a valve phase of the actuator may be adjusted to open the first exhaust valve at the first timing while opening the second exhaust valve at the second timing. The valve phase of the actuator may also be adjusted to enable the first exhaust valve to be opened with the first amount of valve lift for the first duration while opening the second exhaust valve with the second, different amount of valve lift for the second duration.

In another example, a cam profile of the first exhaust valve can be adjusted to open and close the first exhaust valve to selectively exhaust blowdown gases of the cylinder into the first exhaust passage. On the other hand, the cam profile of the second exhaust valve may be adjusted to open the second exhaust valve to selectively exhaust the remaining residual gases of the cylinder into the second exhaust passage.

In this way, using different exhaust valve timings, engine efficiency can be increased while engine emissions are reduced by separating exhaust gases released at higher pressure (e.g., expanding blow-down exhaust gases in a cylinder before time when a piston of the cylinder reaches bottom dead center expansion stroke) from exhaust gases released at lower pressure (e.g., residual exhaust gases that remain in the cylinder after blow-down) into the different exhaust passages. In particular, exhaust energy can be transferred from the blowdown gases to one of two exhaust passages to operate a turbine-generator. At the substantially same time, residual gases may be directed to the other exhaust of the two exhaust passages to heat a catalyst, thereby reducing engine emissions. In this way, exhaust gases can be used more efficiently than simply directing all the exhaust gas of a cylinder through a single, common exhaust port. As such, several advantages may be achieved. For example, the average exhaust gas pressure supplied to the turbine can be increased to improve turbine-generator output. Additionally, fuel economy may be improved and particulate emissions may be reduced by decreasing an engine warm-up time. Further, the method can reduce engine emissions since at least a portion of cylinder exhaust gases are directly routed from the cylinder to the catalyst.

Now turning to FIG. 7, map 700 depicts example intake valve timings and exhaust valve timings, with respect to a piston position, for an engine system including a first exhaust passage and a second, different exhaust passage in order to decrease exhaust energy delivered to a turbine of a turbine-generator located in the first exhaust passage via a blowdown valve by diverting exhaust gas to an exhaust catalyst included in the second exhaust passage via a scavenging exhaust valve.

Map 700 illustrates an engine position along the x-axis in crank angle degrees. Curve 702 depicts piston positions (along the y-axis), with reference to their location from top dead center (TDC) and further with reference to their location within the four strokes (intake, compression, power and exhaust) of an engine cycle.

Curve 704 depicts a first intake valve timing, lift, and duration for a first intake valve (Intake valve_1) coupled to an intake passage of the engine cylinder while curve 706 depicts a second intake valve timing, lift, and duration for a second intake valve (Intake valve_2) coupled to the intake passage of the engine cylinder.

Curve 708 depicts a first blowdown valve timing, lift, and duration for the first blowdown valve coupled to the first exhaust passage of the engine cylinder, while curve 716 depicts a second scavenging valve timing, lift, and duration for scavenging valve coupled to the second exhaust passage of the engine cylinder during normal engine operation when a turbine speed of the turbine-generator is less than a threshold speed and a generator output of the turbine-generator is less than a threshold output.

Curve 710 depicts a third blowdown valve timing, lift, and duration for the first blowdown valve, while curves 712 and 714 depict a fourth scavenging valve timing, lift and duration, and a fifth scavenging valve timing, lift and duration respectively for the scavenging valve.

In one example, during a first condition, the blowdown valve may be operated at the third blowdown valve timing, lift, and duration while the scavenging valve may be operated at the fourth blowdown valve timing, lift and duration. The first condition may include the turbine speed greater than the threshold speed and/or the generator output greater than the threshold output. The first condition may further include a first amount of exhaust gas required to bypass the turbine in order to reduce the turbine speed to a desired speed and/or to reduce the generator output to a desired generator output.

In another example, during a second condition, the blowdown valve may be operated at the third blowdown valve timing, lift, and duration while the scavenging valve may be operated at the fifth blowdown valve timing, lift and duration. The second condition may include the turbine speed greater than the threshold speed and/or the generator output greater than the threshold output. The second condition may further include a second amount of exhaust gas required to bypass the turbine in order to reduce the turbine speed to the desired speed and/or to reduce the generator output to a desired generator output. The second amount of exhaust gas to bypass the turbine may be greater than the first amount of exhaust gas to bypass the turbine.

In the depicted example, the first intake valve (Intake valve_1) and the second intake valve (Intake valve_2) may be opened at a common intake valve timing, starting at or just before 360 degrees BTDC, and ending at or just after 180 degrees BTDC. Additionally, in this example, both the first and second intake valves are opened with the same amount of lift and for the same duration. In other examples, the intake valve opening timings may be staggered while the duration and the lift of the intake valves remain the same.

Now turning to the exhaust valves, during normal engine operation, as discussed at FIG. 6, the blowdown valve is opened at the first blowdown valve opening timing that is earlier in the engine cycle than the second scavenging valve opening timing at which the scavenging valve is opened. In other words, the first blowdown valve opening timing may be advanced relative to the second scavenging valve opening timing. Specifically, the scavenging valve may be opened near 180 degrees ATDC, while the timing of opening of the blowdown valve may be advanced from the scavenging valve opening timing. By opening the blowdown valve prior to opening the scavenging valve, a majority of the blowdown energy may be directed to the turbine coupled to the turbine-generator. Further, by opening the scavenging valve, excess exhaust energy may be directed to the exhaust catalyst, thereby decreasing the backpressure between the turbine inlet and the exhaust port, which may reduce pumping penalty and improve gas mixing.

In one example, during engine operating conditions when the turbine speed is greater than the threshold speed and/or when the generator output is greater than the threshold output, the blowdown valve may be operated at the third blowdown valve timing (710) and duration d3 while the scavenging valve may be operated at the fourth scavenging valve timing (712) and duration d4, wherein the third blowdown valve timing (710) is retarded with respect to the first (normal) blowdown valve timing (708), and the fourth scavenging valve timing (712) is advanced with respect to the second (normal) scavenging valve timing (716). Further, blowdown valve duration d3 may be shorter than the scavenging valve duration d4.

In another example, during engine operating conditions when the turbine speed is greater than the threshold speed and/or when the generator output is greater than the threshold output, the blowdown valve may be operated at the third blowdown valve timing (710) and duration d3 while the scavenging valve may be operated at the fifth scavenging valve timing (714) and duration d5, wherein the third blowdown valve timing (710) is retarded with respect to the first (normal) blowdown valve timing (708), and the fifth scavenging valve opening timing (714) is advanced with respect to the second (normal) scavenging valve opening timing (716). Further, the blowdown valve duration d3 may be shorter than the scavenging valve duration d5, and the fifth scavenging valve duration d5 may be longer than the second (normal) scavenging valve duration d2. By increasing the scavenging valve duration, an increased amount of exhaust gases may be delivered to the second passage via the scavenging valve. Consequently, an amount of exhaust gases delivered to the turbine may decrease. As a result, the turbine speed and the generator output may decrease.

In one example, where the blowdown and the scavenging valves are coupled to an exhaust valve actuator, a valve phase of the actuator may be adjusted to open the blowdown valve at the first timing or third timing while opening the scavenging valve at the second timing, the fourth timing or the fifth timing. The valve phase of the actuator may also be adjusted to enable the blowdown valve to be opened with the first amount of valve lift for the first duration d1, or third duration d3 while opening the scavenging valve with the second, different amount of valve lift for the second duration d2 or a fourth duration d4 or a fifth duration d5.

In another example, a cam profile of the blowdown valve can be adjusted to open and close the blowdown valve to selectively exhaust blowdown gases of the cylinder into the first exhaust passage. On the other hand, the cam profile of the scavenging valve may be adjusted to open the scavenging valve to selectively exhaust the remaining residual gases of the cylinder into the second exhaust passage.

In this way, timing and duration of the blowdown and the scavenge valves may be adjusted in order to reduce the amount of exhaust energy delivered to the turbine-generator.

In some examples, the scavenging valve timing and/or duration may be adjusted while the blowdown valve may be deactivated in order to reduce the turbine speed and/or the generator output. In other words, blowdown valve deactivation may be utilized in combination with adjustment of scavenging valve timing and/or duration to reduce the turbine speed and/or the generator output.

Turning to FIG. 8, it shows a map 800 depicting an example operation of a blowdown exhaust valve (e.g. valve E1 at FIG. 1) and a scavenging exhaust valve (e.g. valve E2 at FIG. 1) to adjust exhaust mass flow to a turbine of a turbine-generator (e.g. turbine-generator 190 at FIG. 1) included in an exhaust system of a split exhaust engine system, such as the engine system 10 at FIG. 1. The sequence of FIG. 8 may be provided by executing instructions in the system of FIGS. 1-2 according to the methods of FIGS. 3, 4, and 5. Vertical markers at times t1-t4 represent times of interest during the sequence. In all the plots discussed below, the X axis represents time and time increases from the left side of each plot to the right side of each plot.

The first plot from top of FIG. 8 depicts turbine speed versus time. The Y axis represents a turbine speed and the turbine speed increases in the direction of the Y axis arrow. Trace 803 represents an actual turbine speed, horizontal line 802 represents a first threshold turbine speed, and horizontal line 804 represents a second threshold turbine speed. As such, the second threshold speed may be greater than the first threshold speed.

The second plot from top of FIG. 8 depicts generator output versus time. The Y axis represents a generator output and the generator output increases in the direction of the Y axis arrow. Trace 806 represents an actual generator output, and trace 808 represents a desired generator output.

The third plot from top of FIG. 8 depicts difference between the actual generator output and the desired generator output, and the difference increases in the direction of the Y axis arrow. Trace 810 represents the difference, and horizontal line 812 represents a threshold difference.

The fourth plot from top of FIG. 8 depicts exhaust mass flow through turbine versus time. The Y axis represents a flow through the turbine and the flow through the turbine increases in the direction of the Y axis arrow. Trace 816 represents the flow through the turbine. For example, exhaust mass flow may be delivered from an engine cylinder to the turbine via the blowdown valve, a first exhaust manifold (e.g. first exhaust manifold 59 at FIG. 1) and a first exhaust passage (e.g. first exhaust passage 55 at FIG. 1).

The fifth plot from top of FIG. 8 depicts exhaust mass flow through an exhaust catalyst (e.g. catalyst 72 at FIG. 1) versus time. The Y axis represents the flow through the catalyst and the flow through the catalyst increases in the direction of the Y axis arrow. Trace 818 represents the exhaust mass flow through the catalyst. For example, exhaust mass flow may be delivered from an engine cylinder to the catalyst via the scavenging valve, a second exhaust manifold (e.g. second exhaust manifold 57 at FIG. 1) and a second exhaust passage (e.g. second exhaust passage 162 at FIG. 1).

The sixth plot from top of FIG. 8 depicts blowdown valve timing versus time. The Y axis represents the blowdown valve timing and a degree of retard decreases in the direction of Y axis arrow. Trace 820 represents the blowdown valve timing, and horizontal line 819 represents a normal blowdown valve timing that may be utilized during normal conditions (such as, when the turbine speed is less than the first threshold and/or when the generator output is below a threshold).

The seventh plot from top of FIG. 8 depicts scavenging valve timing versus time. The Y axis represents the scavenging valve timing and a degree of retard decreases in the direction of Y axis arrow. Trace 822 represents the scavenging valve timing, and horizontal line 821 represents a normal scavenging valve timing that may be utilized during normal conditions (such as, when the turbine speed is less than the first threshold and/or when the generator output is below a threshold).

The eighth plot from top of FIG. 8 depicts blowdown valve duration versus time. The Y axis represents the blowdown valve duration and the duration increases in the direction of Y axis arrow. Trace 824 represents the blowdown valve duration.

The ninth plot from top of FIG. 8 depicts scavenging valve duration versus time. The Y axis represents the scavenging valve duration and the duration increases in the direction of Y axis arrow. Trace 826 represents the blowdown valve duration.

The tenth plot from top of FIG. 8 depicts wastegate valve opening versus time. The Y axis represents a wastegate valve opening amount and the amount increases in the direction of Y axis arrow. Trace 828 represents the wastegate valve opening.

As such, the threshold turbine speed may be based on a desired generator speed to obtain the desired generator output; and the desired generator speed may be based on exhaust mass flow to the turbine via the blowdown exhaust valve and the first exhaust passage, the turbine-driven generator located in the first exhaust passage. The desired generator speed may be further based on current operating conditions as discussed above at FIG. 4.

At times before t1, the turbine of the turbine-generator may be operating at the turbine speed (803) below the first threshold speed (802). The flow through the turbine via the blowdown valve (816) may increase (as a result of increasing engine speed and load, for example). Consequently, the turbine speed may increase but may remain below the first threshold speed. Further, the generator output (806) may increase. However, the difference between the desired generator output and the actual generator output (810) may remain below the threshold (812). Therefore, reduction in turbine speed to decrease the turbine speed or the generator output may not be required. As a result, the engine may be operated normally with blowdown valve operated at the normal blowdown valve timing (820) and duration (824) and scavenge valve operated at the normal scavenging valve timing (822) and duration (826). Details of normal engine operation are discussed at FIG. 6. Further, the wastegate (828) may be closed.

At times just prior to t1, and between t1 and t2, the turbine speed (803) may increase above the first threshold speed and the difference between the actual generator output and the desired generator output (810) may increase above the threshold. Therefore, in order to prevent turbine over-speed conditions and to reduce the electrical output of the generator, the blowdown valve timing may be retarded (820) from normal timing, the scavenge valve timing may be advanced (822) from normal timing, the scavenging valve duration may be increased (826) and the wastegate may be opened. Further, the turbine speed may be above the second threshold. Therefore, a degree of retard of the blowdown valve timing and a degree of advance of the scavenging valve timing may be based on the turbine speed. For example, as the turbine speed increases, the degree of retard of the blowdown valve and the degree of advance of the scavenging valve may increase. Further, as the turbine speed increases, the scavenging valve duration may increase.

At times t2, and between t2 and t3, as a result of retarding blowdown valve timing, advancing scavenging valve timing, opening the wastegate, and increasing the duration of the scavenging valve, exhaust mass flow through the turbine may decrease (816) and exhaust mass flow through the catalyst may increase (818). Consequently, the turbine speed may decrease below the second threshold speed. However, the turbine speed may continue to be above the first threshold speed. Therefore, in order to decrease the turbine speed further, the blowdown valve timing may be retarded, the scavenging valve timing may be advanced, and the duration of the scavenging valve may be increased. Due to turbine speed below the second threshold, the degree of retard of the blowdown valve and the degree of advance of the scavenging valve at t2, t3 and between t2 and t3 may be based on the difference between the actual generator output and the desired generator output. For example, as the difference increases, the degree of retard of the blowdown valve, the degree of advance of the scavenging valve, and the scavenging valve duration may increase. However, the degree of retard of the blowdown valve and the degree of advance of the scavenging valve at t2, t3 and between t2 and t3 may be less than the degree of retard of the blowdown valve and the degree of advance of the scavenging valve at t1 and between t1 and t2. Further, the duration of opening of the scavenging valve at t2, t3 and between t2 and t3 may be shorter than the duration of opening of the scavenging valve at t1 and between t1 and t2. Still further, in the example depicted herein, the wastegate may be closed. However, in some examples, the wastegate may be opened, wherein the degree of opening of the wastegate is based on the difference between the actual and the desired generator output.

Next, between times t3 and t4, as a result of adjusting the blowdown and the scavenging valve phasing and duration, the turbine speed may decrease below the first threshold rate. Due to decrease in turbine speed, the generator output may also decrease. However, the difference between the actual generator output and the desired generator output may continue to be greater than the threshold. Therefore, due to the difference between the actual and the desired generator output being greater than the threshold, the turbine speed and the generator output may be decreased further by adjusting the blowdown and the scavenging valve timing and duration based on the difference. For example, as the difference decreases, the degree of retard of the blowdown valve, the degree of advance of the scavenging valve, and the scavenging valve duration may decrease.

Next, at times t4 and beyond, the turbine speed (803) may be below the first threshold speed and the difference between the actual and the desired generator output may be below the threshold difference. Consequently, the engine may resume normal operation. As such the normal engine operation may be based on current engine speed and load conditions, and additionally based on mass air flow in to the engine. For example, normal operation may include operating the blowdown valve at a first normal blowdown valve timing and operating the scavenging valve at a second normal scavenging timing. As such, the first normal blowdown valve timing may be advanced with respect to the second normal scavenging valve timing in order to direct a majority of blowdown exhaust energy to the turbine. Further, by opening the scavenging valve later during the exhaust cycle, high back-pressure between the exhaust ports and the turbine inlet may be reduced. Consequently pumping losses may be reduced. Details of valve timings for normal engine operation are elaborated at FIG. 6.

In this way, by modulating timing and duration of the blowdown and the scavenging valves, and adjusting the wastegate during conditions when the turbine speed is greater than the threshold speed, and/or when the generator output is greater than desired, the amount of exhaust blowdown energy delivered to the turbine may be reduced while the amount of scavenging energy delivered to an exhaust manifold may be increased.

It must be noted that while the above example illustrates simultaneously adjusting the blowdown valve timing, the scavenging valve timing, the scavenging valve duration and the wastegate opening to decrease turbine speed, and/or generator output, in some examples, only one of the blowdown valve timing, or the blowdown valve duration, or the scavenging valve timing, or the scavenging valve duration, or the wastegate opening may be adjusted. In some other examples, more than one parameter discussed above may be adjusted.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine with split exhaust, the method comprising:
measuring and/or estimating a turbine speed via one or more sensors during an engine operating condition; and
in response to determining, with an engine controller, that the turbine speed is greater than a first threshold turbine speed,
retarding an opening time of a first exhaust valve of a cylinder delivering exhaust gas to a turbine of a turbine-generator, the opening time of the first exhaust valve retarded via an actuation system.

2. The method of claim 1, further comprising advancing an opening time of a second exhaust valve of the cylinder delivering exhaust to an exhaust catalyst while bypassing the turbine, and further comprising increasing an opening duration of the second exhaust valve via the actuation system in response to determining that the turbine speed is greater than the first threshold turbine speed.

3. The method of claim 2, further comprising increasing a degree of a wastegate valve opening in response to determining that the turbine speed is greater than the first threshold turbine speed.

4. The method of claim 1, further comprising measuring and/or estimating a generator output via one or more sensors; and
in response to determining, with the engine controller, that the generator output is greater than a threshold, retarding the opening time of the first exhaust valve, and advancing the opening time of the second exhaust valve via the actuation system, the generator output including one or more of a generator output voltage, a generator output current, or a generator output power.

5. The method of claim 4, further comprising, in response to determining with the engine controller that a difference between the generator output and a desired generator output is less than a first threshold difference, operating the first exhaust valve at a first normal exhaust valve opening timing and a first normal exhaust valve opening duration via the actuation system; and operating the second exhaust valve at a second normal exhaust valve opening timing and a second normal exhaust valve opening duration via the actuation system.

6. The method of claim 1, wherein the first threshold turbine speed is based on a desired generator speed.

7. The method of claim 6, wherein the desired generator speed is based on a battery state of charge, an electrical demand or electrical load, an engine speed, an engine load, and an amount of exhaust mass flow into the turbine via the first exhaust valve.

8. The method of claim 5, wherein the first normal exhaust valve opening timing is advanced with respect to the second normal exhaust valve opening timing.

9. A method for operating an engine with split exhaust including a turbine in a first exhaust passage coupled to a generator and an exhaust catalyst in a second exhaust passage, the method comprising:
   measuring and/or estimating a turbine speed via one or more sensors during an engine operating condition; and
   responsive to determining, with an engine controller, a first condition, wherein the first condition includes the turbine speed being greater than a first threshold speed and a second threshold speed,
      flowing exhaust gas to the turbine via a first exhaust valve from an engine cylinder to the first exhaust passage;
      flowing exhaust gas to the catalyst via a second exhaust valve from the engine cylinder to the second exhaust passage; and
      advancing an opening time of the second exhaust valve relative to a normal opening time of the second exhaust valve and increasing an opening duration of the second exhaust valve relative to a normal opening duration of the second exhaust valve, wherein the first and the second exhaust valves are controlled via an actuation system.

10. The method of claim 9, further comprising, in response to determining the first condition via the engine controller, retarding an opening time of the first exhaust valve relative to a normal opening time of the first exhaust valve, and opening a waste gate; and
   further comprising, in response to determining, with the engine controller, a second condition, wherein the second condition includes the turbine speed being less than the second threshold speed and greater than the first threshold speed, and a difference between an actual generator output and a desired generator output being greater than a second threshold difference,
   retarding the opening time of the first exhaust valve relative to the normal opening time of the first exhaust valve,
   advancing the opening time of the second exhaust valve relative to the normal opening time of the second exhaust valve,
   increasing the opening duration of the second exhaust valve relative to the normal opening duration of the second exhaust valve, and
   closing the wastegate to decrease exhaust gas flow to the turbine.

11. The method of claim 10, further comprising, responsive to determining, with the engine controller, a third condition, wherein the third condition includes the turbine speed being less than the second threshold speed, and the difference between the actual generator output and the desired generator output being less than the second threshold difference and greater than a first threshold difference, retarding the opening time of the first exhaust valve relative to the normal opening time of the first exhaust valve, advancing the opening time of the second exhaust valve relative to the normal opening time of the second exhaust valve, increasing the opening duration of the second exhaust valve relative to the normal opening duration of the second exhaust valve, and closing the wastegate to decrease exhaust gas flow to the turbine.

12. The method of claim 11, wherein the opening time of the first exhaust valve is retarded by a greater amount in response to the first condition than in response to the second condition.

13. The method of claim 12, wherein the opening time of the first exhaust valve is retarded by a greater amount in response to the third condition than in response to the second condition.

14. The method of claim 12, wherein the opening duration of the second exhaust valve is greater in response to the first condition than in response to the second condition; and wherein the opening duration of the second exhaust valve in response to the second condition is greater than in response to the third condition.

15. The method of claim 10, wherein increasing the opening duration of the second exhaust valve relative to the normal opening duration of the second exhaust valve includes advancing the opening timing of the second exhaust valve from the normal opening timing of the second exhaust valve, and not changing a closing timing of the second exhaust valve with respect to a normal closing timing of the second exhaust valve.

16. The method of claim 15, wherein the normal opening time of the second exhaust valve includes opening the second exhaust valve between 170 and 210 degrees after top dead center and closing the second exhaust valve between 350 and 390 degrees after top dead center.

17. The method of claim 16, wherein a first amount of exhaust gas bypassing the turbine during the first condition is greater than a second amount of exhaust gas bypassing the turbine during the second condition; and wherein the second amount of exhaust gas during the second condition is greater than a third amount of exhaust gas during the third condition.

18. A system comprising:
   an engine cylinder;
   a first exhaust valve for delivering an initial portion of exhaust gas from the cylinder to a turbine of a turbine-generator via a first exhaust passage;
   a second exhaust valve for delivering a latter portion of exhaust gas from the cylinder to an exhaust catalyst via a second exhaust passage separate from the first exhaust passage; and
   a controller with computer readable instructions included on a non-transitory computer readable medium for:
      measuring and/or estimating a turbine-generator speed during an engine operating condition;
      retarding an opening time of the first exhaust valve with respect to a first normal exhaust valve opening timing in response to the turbine-generator speed being greater than a threshold turbine-generator speed; and
      advancing an opening time of the second exhaust valve with respect to a second normal exhaust valve opening timing.

19. The system of claim 18, further comprising instructions for, in response to a difference between an actual turbine-generator output and a desired turbine-generator output less than a threshold difference, operating the engine with the first normal exhaust valve opening timing and the second normal exhaust valve opening timing; wherein the first exhaust valve opening timing is advanced with respect to the second exhaust valve opening timing.

20. The system of claim 19, further comprising instructions for increasing valve opening retard amount of the first exhaust valve and increasing valve opening advance amount of the second exhaust valve with an increase in turbine-generator speed.

\* \* \* \* \*